July 9, 1968

W. F. BAUGH 3,391,940

WEAR SLEEVE HAVING A GASKETING FLANGE AND A TAPERED
WALL FOR SPACING A CYLINDRICAL WEAR SLEEVE
PORTION FROM A ROTARY MEMBER AND ENGINE
INSTALLATION INCORPORATING
SAID WEAR SLEEVE

Filed Jan. 10, 1966

United States Patent Office 3,391,940
Patented July 9, 1968

3,391,940
WEAR SLEEVE HAVING A GASKETING FLANGE AND A TAPERED WALL FOR SPACING A CYLINDRICAL WEAR SLEEVE PORTION FROM A ROTARY MEMBER AND ENGINE INSTALLATION INCORPORATING SAID WEAR SLEEVE
William F. Baugh, Huntington Woods, Mich., assignor to Federal-Mogul Corporation, Detroit, Mich., a corporation of Michigan
Filed Jan. 10, 1966, Ser. No. 519,758
4 Claims. (Cl. 277—58)

ABSTRACT OF THE DISCLOSURE

In an engine installation having a rotating shaft provided with a projecting key, a stationary housing having a bore, a hub having a thin sleeve keyed to the shaft for rotation therewith and interposed between the shaft and housing, and having an end wall, a lip-type seal installed in said housing, and another engine part keyed to said shaft, the combination therewith of a special annular metal member. This member has a cylindrical wear sleeve portion in engagement with the seal lips and a radial end wall joined to the wear sleeve portion by a tapered wall. The tapered wall abuts the hub sleeve and centers the metal member relative to said hub with the cylindrical wear sleeve portion spaced away from at least a portion of the hub sleeve. The radial end wall has an annular bead formed therein to be compressed when gasketing between the hub sleeve end wall and the other engine part. The metal member also has a radially outwardly extending flange at the opposite end of the wear sleeve portion from the radial end wall and a shield portion extending radially and axially away from the radially extending flange toward the end wall.

---

This invention relates to an improved fluid seal which acts to seal oil between a rotating shaft and bore while also acting as a rotating static seal between two axially abutting rotating elements keyed to the rotating shaft.

There are several places where such a seal is particularly useful. For example, it may be used as a pinion seal. Another installation where the seal solves some difficult and significant problems is that between a fan-belt pulley hub and a timing gear in an automotive engine. Seals in this latter position have, with distressing frequency, heretofore tended to leak, resulting in the consistent loss of oil, and have given trouble on numerous occasions. Of course, any oil seal which leaks is a potential source of trouble.

The apparent cause of the leakage seems to have been related to the splining or keying of the fan-belt pulley hub to the engine crankshaft, for in making the spline or keyway, the already thin hub sleeve where the seal is normally positioned is further thinned. This thinned portion tends to develop a flat spot on the outer periphery of the sleeve over the keyway. Whether the flat spot was actually formed directly upon installation over the keyway, or whether it was formed upon machining of the keyway or turning of the hub outer periphery is irrelevant, for in any event, such flat spots have frequently developed, giving rise to leakage. When a wear sleeve was installed around it, a matching flat spot developed on the wear sleeve and gave rise to the leakage.

One object of the present invention is to solve this problem of leakage by providing a type of wear sleeve which does not transmit or become deformed by flat spots on the hub and which remains round during operation.

Another problem occurring in the same assembly is that of providing a static seal between the rotating hub and the rotating timing gear which is adjacent the hub. Heretofore, this has required the installation of a fiber disc gasket with the hub closed up tightly against it.

Another object of the present invention is to provide the needed static seal without having to provide an additional gasket and without affecting the rotary seal. In the present invention this is done by making it part of the novel wear sleeve of the invention.

Another problem in the same installation is that of keeping dirt and other foreign matter out of the seal. To some extent this can be done by using a dust lip seal, but it is best to provide some form of dirt shield to deflect foreign matter and keep it from reaching the auxiliary lip and wearing it.

Another object of the present invention is, therefore, to solve this problem by providing a dirt shield which is integral with the wear sleeve.

Other objects and advantages of the invention will appear from the following description of a preferred form thereof.

Figure 3:
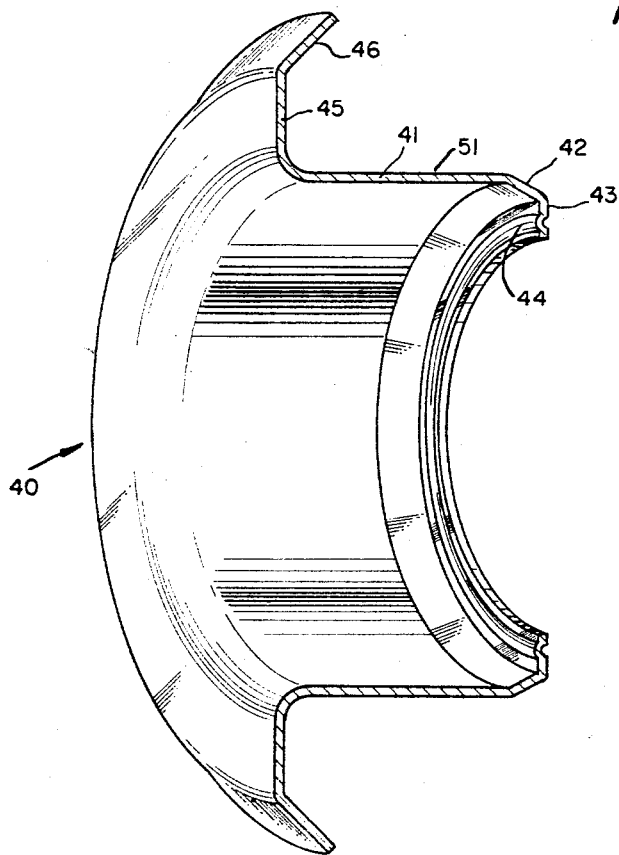

FIG. 3 is a view in perspective and partly in section of the metal sleeve member which is used in this application to provide (1) a wear sleeve against which the lips of the oil seal run in a rotary sealing engagement, (2) a dirt and rock shield to protect the seal from foreign matter, and (3) a gasket which forms a static seal between the end of the hub and the wall of the timing gear or related member which is rotating with the hub and the shaft.

Referring to the drawings, a portion of a crankshaft 10 is shown provided with a recess 11 to receive a key or spline member 12. A timing gear 13 has a bore 14 with a recessed keying portion 15 that locks with the key 12, so that the timing gear 13 rotates with the shaft 10.

A torsional vibration dampener 20, which is used as part of the fan belt pulley system, is provided with a hub 21 which has an axially extending sleeve or collar 22, and the bore 23 of the collar 22 is provided with a groove or keyway 24 to receive the key 12. The groove 24 results in a thinning of the hub collar wall 22 and apparently is what gives rise to the flattening which tends to occur and which tends to cause oil leakage at the seal in prior art structures.

It has been conventional to install a rotary lip-type seal 25 between the hub sleeve 22 and a stationary part, such as a timing gear cover 26. In a typical installation, this housing 26 has an axially extending flange 27 on the timing gear side to help to protect against direct oil splash, and has a radially extending portion 28 which is stepped axially away from the timing gear 13 to provide a cylindrical portion 30 and an inner radial portion 31. The inner radial portion 31 and the cylindrical portion 30 each have inner walls providing a bore 32 and an end wall 33 against which the seal 25 is installed. The actual structure of the sealing member 25 is not critical in the invention; a very good seal is shown with a main oil sealing lip 34 and an auxiliary dirt-excluding lip 35.

A very important and a particularly novel feature of the invention is an annular metal member 40 which provides a cylindrical wear sleeve portion 41 having a tapered end portion 42 leading to a radial end portion 43 wherein an annular gasketing bead 44 is provided. At the other end of the wear sleeve portion 41, the metal member 40 is formed to provide a radially outwardly extending flinging flange 45, which leads to a backwardly extending dirt shield terminal portion 46 that extends angularly axially back from the radial portion 45 and radially outwardly with respect to the shaft 10.

The wear sleeve portion 41 does not fit snugly around the hub sleeve 22; hence, the hub sleeve 22 will not transmit any flattening force and as a consequence it will not develop a flat spot on the outer cylindrical periphery 51 of the wear sleeve 41 which engages the oil seal lips 34 and 35. Instead, there is a small clearance 47, and contact and centering are obtained by the abutment of tapered portion 42 against the hub sleeve 22. While the sleeve 22 is shown as having a bevel 48 connecting its end wall 49 to a cylindrical wall 50, this is not essential, and the tapered portion 42 does not depend on the presence of such a beveled wall 48, even though the beveled wall 48 may be preferable. The main purpose of the taper 42 is to provide accurate centering so that the wear sleeve 41 portion will be uniformly spaced from the hub sleeve 22 and will not cause leakage past the seal due to excessive runout.

Figure 1:
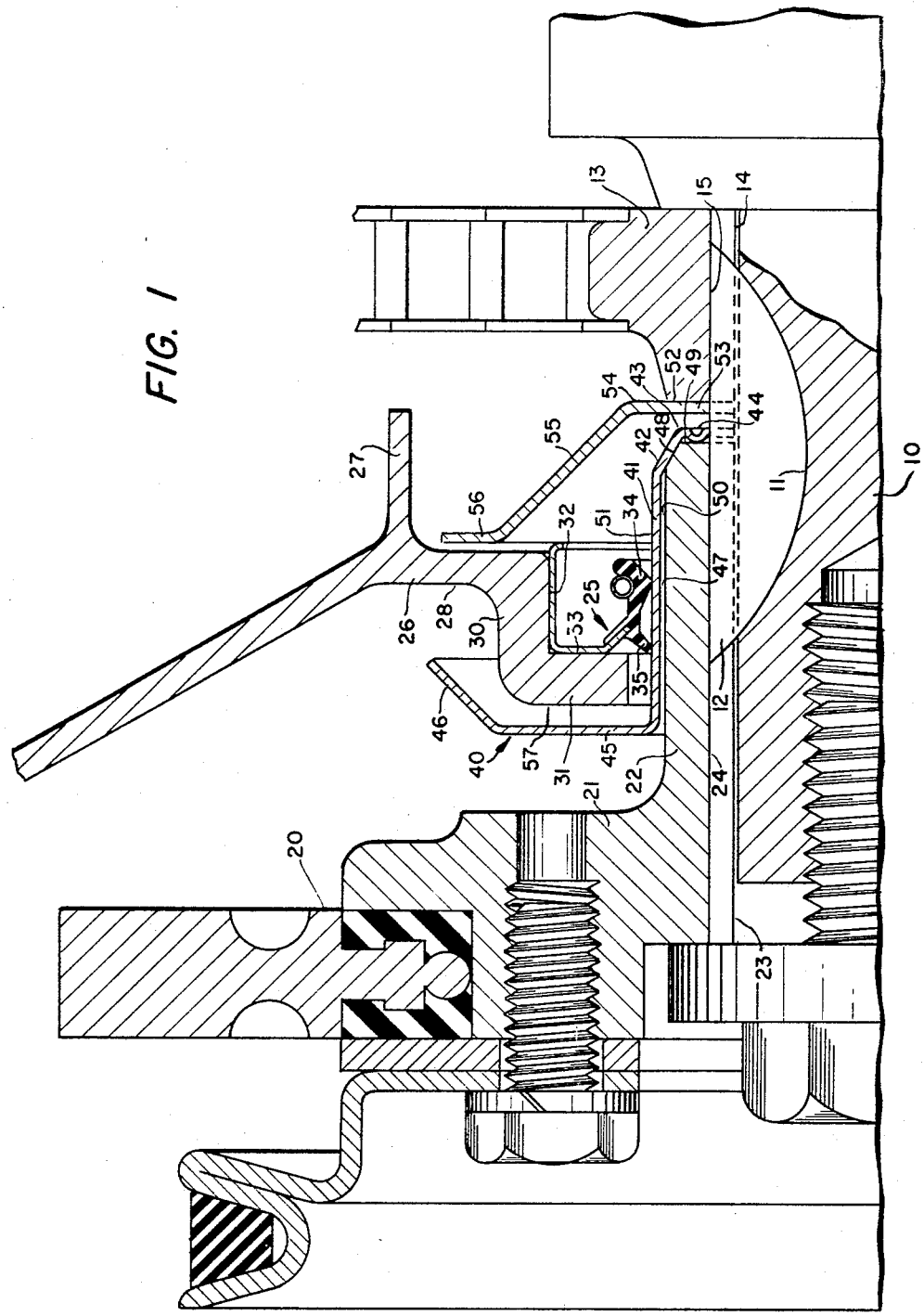
FIG. 1 is a fragmentary view in elevation and in section of a portion of an automotive engine incorporating the principles of the present invention. In this view the parts are shown partly installed before completion of the installation.
Figure 2:
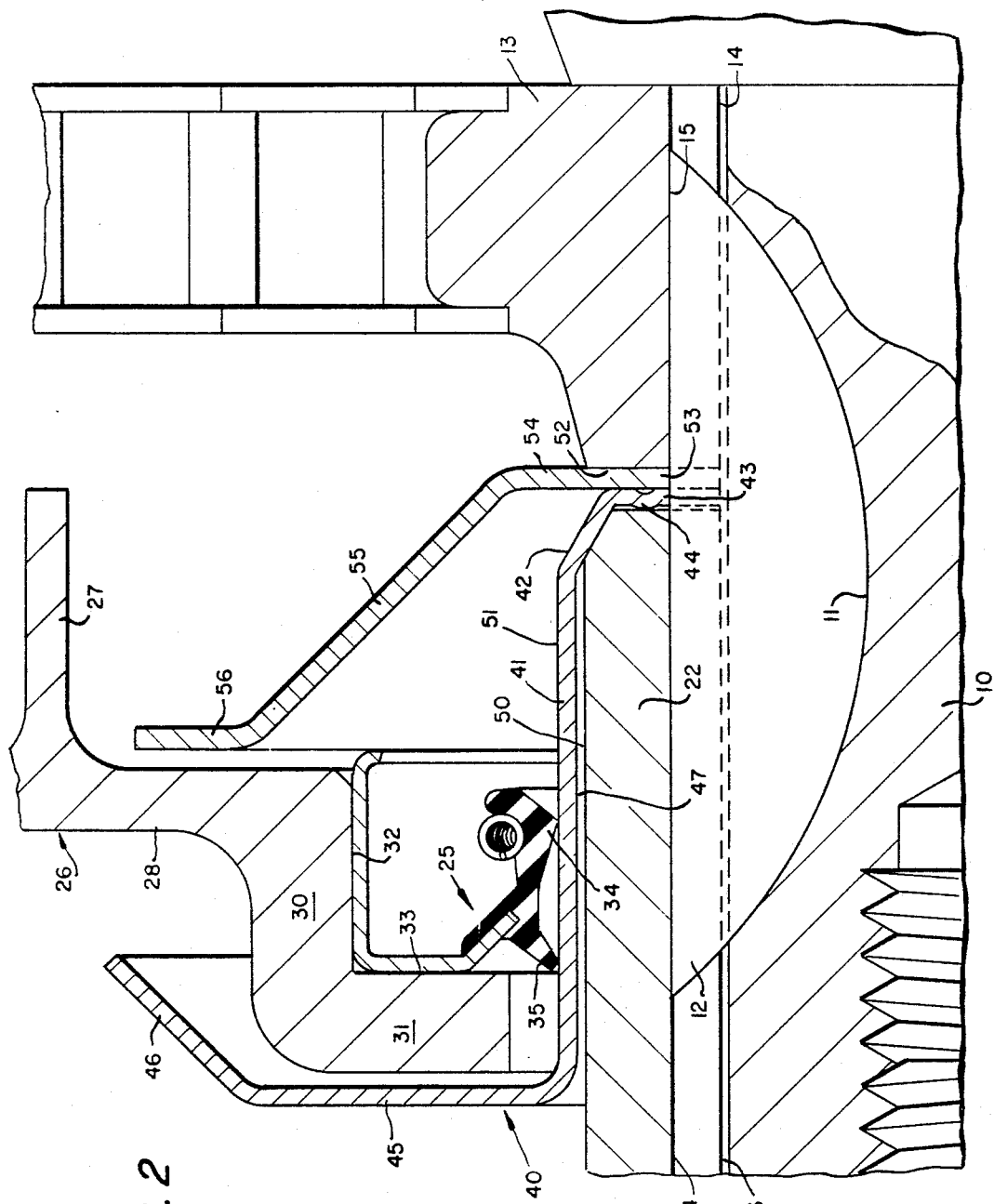
FIG. 2 is a fragmentary view of a portion of the installation of FIG. 1, enlarged with respect to FIG. 1, and showing the seal and other parts at their completely installed position.

As shown in FIG. 1, during installation the seal 25 is installed into the timing gear cover 26, and the wear sleeve 40 is placed over the hub sleeve 22, with its bead 44 against the end wall 49. When the hub 20 is fully installed (see FIG. 2) the end portion 43 is pushed against the timing gear wall 52, or against an interposed shield member 53 which is shown as having an inner radially outwardly extending portion 54 succeeded by an outer angularly extending portion 55 and then an outer radially extending portion 52. This member 53 may be absent, and the end wall 49 may abut directly against the timing gear 13. In any event, the thrust force of the hub sleeve 22 is resolved against the bead 44, while the peripheral portions 43 around the bead 44 abut the timing gear wall or the shield member 53. The gasketing is completed by providing sufficient force, as shown in FIG. 2, to somewhat flatten the bead 44, in order to make sure that the parts are firmly locked together in thrust. When so installed, the seal at 43 and 44 is a static seal, even though the parts 22, 53 and 13 are rotating, because they rotate together.

The main lip 34 and auxiliary lip 35 of the sealing member 25 engage the outer periphery 51 of the wear sleeve portion 41 and form a dynamic seal, which is not affected by any flattening of the thin hub sleeve 22. The radial portion 45 of the shield portion of the metal member 40 extends parallel to, and closely adjacent to the radial end wall 57 of the timing gear housing 26, and its outer portion 46 angles back beyond the wall 57 of the radial portion 31, so as to define a labyrinthine path which deflects dirt and other particles from entering the seal area. It is therefore difficult for foreign matter to get into the auxiliary lip 35 and cause trouble there; so the installation is able to perform much more efficiently than was heretofore possible.

Thus, in the completed seal the metal member 40 performs the function of a wear sleeve 41 standing away from the hub sleeve 22 and therefore unaffected by defects therein and engaging seal lips 34 and 35 to provide a dynamic seal, a gasket 43, 44 for the static seal, and a rock shield 45, 46 protecting the elastomeric sealing lip 35 from damage by outside elements.

To those skilled in the art to which this invention relates, many additional changes in construction and widely differing embodiments of the invention will suggest themselves without departing from the spirit and scope of the invention as defined in the claims.

What is claimed is:

1. In an engine installation having a rotating shaft provided with a projecting key, a stationary housing having a bore, a hub having a thin sleeve keyed to said shaft for rotation therewith and interposed between said shaft and said housing, and having an end wall, a sealing member having sealing lips and installed in said housing, and another engine part keyed to said shaft, the combination therewith of an annular metal member having a cylindrical wear sleeve portion in engagement with said sealing lips and a radial end wall joined to said wear sleeve portion by a tapered wall, said tapered wall abutting said hub sleeve and centering said metal member relative to said hub with said cylindrical wear sleeve portion spaced away from at least a portion of said hub sleeve, said radial end wall having an annular bead formed therein and serving to be compressed for gasketing between said hub sleeve end wall and said other engine part.

2. In an engine installation having a rotating shaft provided with a projecting key, a stationary housing having a bore, a hub having a thin sleeve keyed to said shaft for rotation therewith and interposed between said shaft and said housing, and having an end wall, a sealing member having sealing lips and installed in said housing, and another engine part keyed to said shaft, the combination therewith of an annular metal member having a cylindrical wear sleeve portion in engagement with said sealing lips and a radial end wall joined to said wear sleeve portion by a tapered wall, said tapered wall abutting said hub sleeve and centering said metal member relative to said hub with said cylindrical wear sleeve portion spaced away from at least a portion of said hub sleeve, said radial end wall having an annular bead formed therein and serving to be compressed for gasketing between said hub sleeve end wall and said other engine part, said metal member also having a radially outwardly extending flange at the opposite end of said wear sleeve portion from said radial end wall and a shield portion extending radially and axially away from said radially extending flange toward said end wall.

3. A wear sleeve for rotary sealing engagement with a sealing member having sealing lips and for surrounding a first rotary member coaxial with said wear sleeve so as to be spaced from it and to be held between end walls of said first rotary member and a second rotary member, comprising an annular metal member having a cylindrical wear sleeve portion for engagement with said sealing lips and a radial end wall joined to said wear sleeve portion by a tapered wall adapted to engage an end wall of said first rotary member for centering said wear sleeve relative to said first rotary member while spacing said cylindrical wear sleeve portion from said rotary member, said radial end wall having an annular bead formed therein and serving to be compressed for gasketing between said end walls of said two rotary members to provide a static seal between them.

4. The wear sleeve of claim 3 wherein said metal member also has a radially outwardly extending flange at the opposite end of said wear sleeve portion from said radial end wall and a shield portion extending radially and axially away from said radially extending flange toward said radial end wall.

References Cited

UNITED STATES PATENTS

| | | | |
|---|---|---|---|
| 1,851,948 | 3/1932 | Summers | 277—211 |
| 2,153,499 | 4/1939 | Chievitz | 277—58 |
| 2,379,547 | 7/1945 | Sperry | 277—58 X |
| 2,564,792 | 8/1951 | Roos | 277—133 X |
| 2,879,114 | 3/1959 | Bowen | 277—35 X |
| 3,163,476 | 12/1964 | McKinven | 308—187.1 |

LAVERNE D. GEIGER, *Primary Examiner.*

J. S. MEDNICK, *Assistant Examiner.*